United States Patent [19]  [11] 4,281,758
Adamski et al. [45] Aug. 4, 1981

[54] HIGH-SPEED CLOSURE ORIENTING APPARATUS

[75] Inventors: Richard T. Adamski, Lambertville, Mich.; Samuel J. Kowal, Maumee, Ohio

[73] Assignee: Owens-Illinois, Inc., Toledo, Ohio

[21] Appl. No.: 89,698

[22] Filed: Oct. 30, 1979

[51] Int. Cl.³ .................. B65G 11/20; B65G 47/24
[52] U.S. Cl. .................................. 198/398; 193/45; 198/400
[58] Field of Search .............. 198/398, 399, 400; 193/45; 221/157, 158, 159

[56] References Cited

U.S. PATENT DOCUMENTS

| 3,123,198 | 3/1964 | Hohl et al. .................. 198/400 |
| 3,650,369 | 3/1972 | Vergobbi .................. 198/400 X |
| 3,726,385 | 4/1973 | Sterling . |
| 3,741,366 | 6/1973 | Van Melle et al. . |
| 3,860,145 | 1/1975 | Miller . |

Primary Examiner—Jeffrey V. Nase
Attorney, Agent, or Firm—John R. Nelson; Myron E. Click; David H. Wilson

[57] ABSTRACT

The invention provides an apparatus for effecting the orientation of shallow disc-shaped articles such as closures, lids and caps so that all such articles are moving at high speed in side by side relationship with each article having its recessed side in the same orientation as all other articles. Such orientation is accomplished by the employment of a single rotating wheel, the elastomeric peripheral surface of which projects through one wall of a feed chute through which the successive articles are moving at high speed in side by side relationship, and co-operates with an aperture in the opposite side wall of the chute to effect the selective direction of the successive articles into either one of two transfer chutes disposed in Y-shaped, tangential relationship to the end of the first mentioned chute according to whether the recessed face of the article is facing toward or away from the wheel periphery.

2 Claims, 5 Drawing Figures

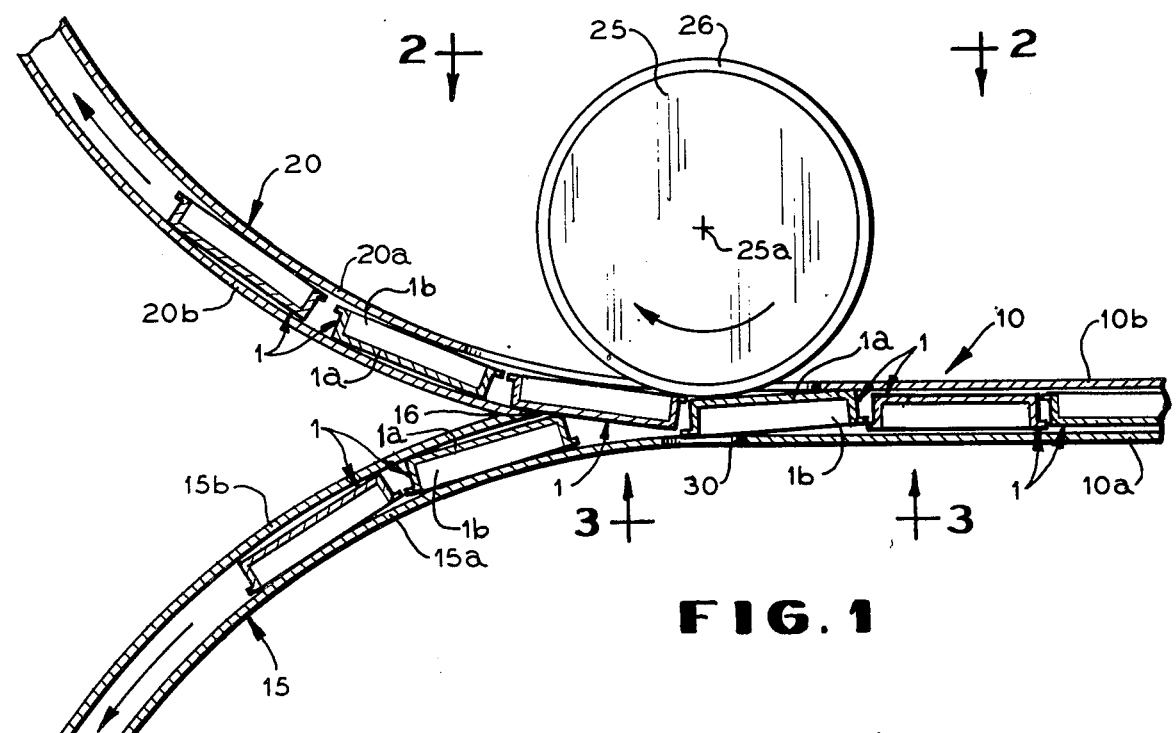
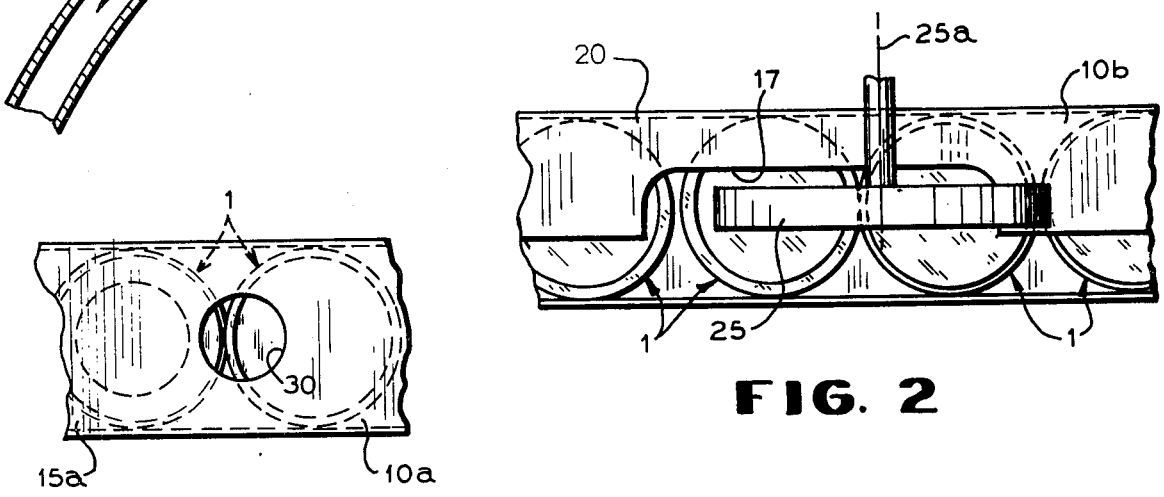
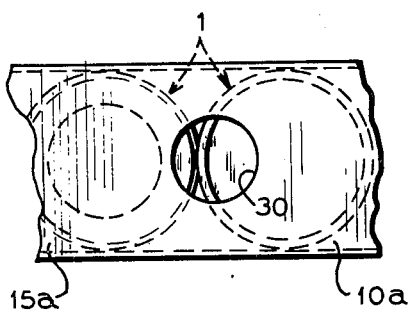
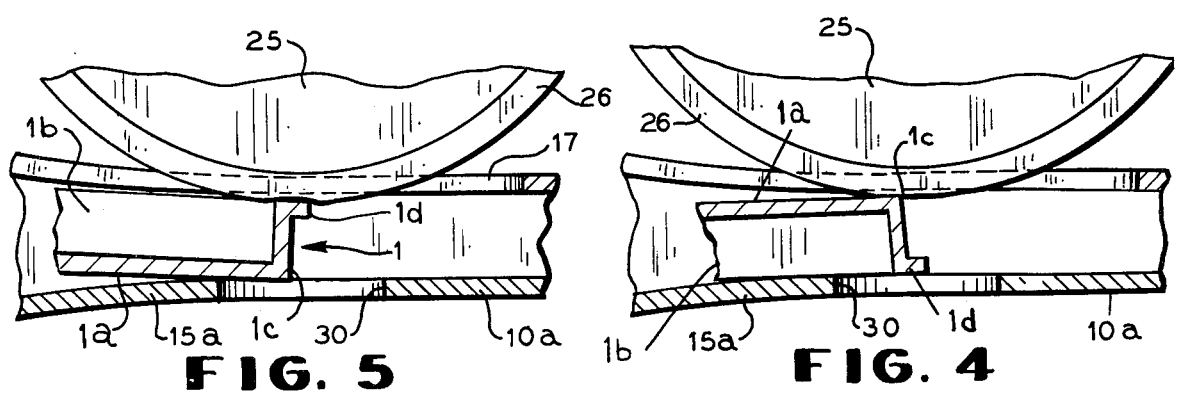

4,281,758

HIGH-SPEED CLOSURE ORIENTING APPARATUS

BACKGROUND OF THE INVENTION

The automatic application of closures, caps or lids to filled containers at high speeds has become a standard feature of filling lines for the food, beverage and pharmaceutical industries. In many instances, the closures to be applied are of relatively shallow disc-shaped configuration having one planar end face and the opposite end face having a recessed configuration to engage the neck of the container. It is obviously necessary that successive closures being fed into automatic filling machines be oriented so that the recessed side or each successive closure is disposed in the proper orientation so that the cap applicating mechanism can apply the successive closures to the neck portions of successive containers.

Devices have heretofore been proposed for effecting such orientation but have not been generally satisfactory because they, in the most part, rely upon the interaction of relatively movable elements, such as pivoted flippers, or the like, which engage the improperly oriented closures and effect a reversal of such closures. When processing speeds on the order of three thousand units per minute are required, these devices have proven to be completely ineffective because the flipping mechanism cannot function that fast to effect the proper orientation of a misoriented closure. Typical of such prior art devices is that shown in U.S. Pat. No. 3,741,366.

SUMMARY OF THE INVENTION

This invention provides a high-speed orienting apparatus for shallow height caps, lids and similar closures wherein the only moveable element of the orienting apparatus is a constantly rotating wheel having its rim portion formed of an elastomeric material and projecting through one side wall of a feed chute for the closures to successively engage the closures passing therethrough and exert a compression force thereon. The other wall of the closure chute is provided with an aperture immediately adjacent the maximum compression point of contact of the wheel perimeter with the passing closure and the cooperation of the elastomeric wheel perimeter with the aperture effects a lateral swinging movement only of those closures which are oriented with their recessed faces adjacent the wheel, permitting such closures to enter into one of a pair of tangentially disposed, Y-connected chutes constituting continuations of the primary feeding chute, while other closures, which are disposed with their panel portions adjacent the wheel perimeter continue in essentially the same direction as in the feeding chute and enter the second of the chutes involved in the Y-shaped connection.

Further objects and advantages of the invention will be apparent to those skilled in the art from the following detailed description, taken in conjunction with the annexed sheets of drawings, on which there is shown a preferred embodiment of the invention.

BRIEF DESCRIPTION OF THE DRAWINGS

FIG. 1 is a schematic, sectional view of a closure sorting apparatus embodying this invention.

FIG. 2 is a sectional view, taken on the plane 2—2 of FIG. 1.

FIG. 3 is a sectional view taken on the plane 3—3 of FIG. 1.

FIG. 4 an enlarged scale view of a portion of FIG. 1, but showing the swinging effect of the discriminator wheel on a closure having its panel portion oriented away from the surface of the discriminator wheel.

FIG. 5 is a view similar to FIG. 4 illustrating the effect on a closure oriented with its panel surface adjacent the discriminator wheel.

DESCRIPTION OF THE PREFERRED EMBODIMENT

Referring to the drawings, the numeral 1 schematically represents a cap or closure required to be oriented. Such closure is of generally cylindrical or disc-shaped configuration and has a panel end face 1a and a recessed end face 1b which is, of course, configured to engage the neck of the container to which the closure is to be applied.

Numeral 10 schematically represents a feed chute into which a plurality of closures 1 are inserted and moved along in side by side rolling relationship by any conventional feeding mechanism (not shown). As is shown in the drawings, the closures 1 may be oppositely oriented in the feed chute 10 insofar as the direction that their recessed faces 1b and their panel faces 1a are disposed. To apply such successively to respective containers in an automatic closure applicating machine, it is necessary that all of the closures be oriented so that all panel surfaces 1a are disposed in the same direction, and hence, all recessed faces 1b are disposed in the opposite direction.

To accomplish such orientation, the feed chute 10 connects by virtue of a Y-shaped juncture with two arcuately-shaped chutes 15 and 20. The outer wall 15a of the chute 15 merges with the outer wall 10a of chute 10 in tangential relationship, and the outer wall 20a of feed chute 20 merges with the other wall 10b of feed chute 10 in tangential relationship. The two inner walls 15b and 20b of transfer chutes 15 and 20 respectively merge in a vertex 16, which has a specific location which will be hereinafter discussed.

The lateral width of the feed chute 10 and transfer chutes 15 and 20 are in excess of the thickness of the closures 1 so that the closures, when in the particular chute, can move freely along the chute in side by side, rolling relationship.

While no specific top or bottom walls are shown for the respective chutes 10, 15 and 20 those skilled in the art will recognize that such walls are necessary. Furthermore, while the walls 10a, 15a, 15b, 20a and 20b have been shown as being essentially solid, it will also be obvious to those skilled in the art that the walls could comprise a plurality of closely spaced parallel bar or rod members. Furthermore, while for clarity of description, the walls 10a and 15a have been separately described and numbered, as have the walls 10b and 20a, it will be readily apparent that these walls could be continuous elements as shown in the drawings.

As best shown in FIG. 2, the juncture portions of wall surfaces 10b and 20a of feed chutes 10 and 15 respectively are provided with a slot 17. A discriminator wheel 25 is mounted for rotation about an axis 25a which is laterally aligned with, but laterally spaced from the juncture of wall 10a and wall 15a. The periphery of the discriminator wheel 25 is provided with a rim or band 26 of an elastomeric material which projects through the slot 17 and the effective radius of the elastomeric surface 26 is selected so as to impart a significant compressive force against each successive closure 1 as it passes out of the end of the feed chute 10. Discriminator wheel 25 is, of course, driven by a suitable power source (not shown) at a speed selected so that its peripheral rotational speed matches the desired speed of movement of the closure along the feed chute 10.

In accordance with this invention, the selective separation of the non-oriented closures 1 into the two transfer chutes 15 and 20 in accordance with whether the recessed surfaces 1b of the closures 1 are facing toward or away from the peripheral surface 26 of the discriminator wheel 25, may be effected through the simple expedient of providing an aperture 30 at the juncture of chute walls 15a and 10a. While not limited thereto, the aperture 30 may conveniently comprise a circular hole having its axis passing through the axis of rotation 25a of the discriminator wheel 25. More importantly, the size of aperture 30 is proportioned so that a trailing rim segment 1c (FIG. 5) of the recessed face 1b of a closure 1 may be momentarily depressed into such aperture by the compressive action of the discriminator wheel 25 coupled with the embedding of the trailing wall portion 1d of the recessed face 1b in the elastomeric material 26 at wheel 25. This effects a lateral swinging movement toward the axis of the discriminator wheel 25 of each closure 1 whose recessed face 10b is facing toward the perimeter of the discriminator wheel 25. These closures then enter chute 20. Those closures 1 whose panel face 1a is engaged by the periphery of the discriminator wheel 25 cannot achieve the same degree of embedding of the trailing rim 1c (FIG. 4) hence will be propelled by the elastomeric surface 26 of the discriminator wheel 25 in essentially the same direction as the feed chute 10, as shown in FIG. 4. Hence these closures will enter the transfer chute 15 and will all be similarly oriented in such chute. The closures that are subjected to the swinging movement by the discriminator wheel 25 will enter the transfer chute 20 and will all be similarly oriented in such transfer chute.

The vertex 16 of the Y-shaped juncture of the transfer chutes 15 and 20 should be located approximately the same distance from the axis of the aperture 30 as the diameter of the closures 1 to be oriented. It is further positioned in alignment with the center of feed chute 10. This dimensional relationship will insure that those closures which are oriented with the recessed faces toward the discriminator wheel 25 will have sufficient room to swing toward the wheel and hence enter the transfer chute 20, while conversely, the oppositely oriented closures 1 which are not subjected to the swinging movement will have their leading edge engaged by the vertex 16 and directed into the transfer chute 15.

Those skilled in the art will recognize that the two transfer chutes 15 and 20 may be combined at a later position in the feeding mechanism for the capping machine and the closures contained in one of the transfer chutes 15 and 20 passed through a loop configuration to bring the orientation of the closures contained therein into exact conformity with that in the other transfer chute at the point where the re-combination of the chutes is effected. Alternatively, one of the transfer chutes may merely feed back into the supply hopper (not shown) for the feed chute 10.

The elastomeric surface 26 of wheel 25 may be formed of polyurethane having a durometer of about 60. Alternatively, the entire wheel may be molded from such elastomeric material.

It is apparent that the described closure orienting apparatus is capable of reliable operation at high speeds. Orienting speeds of three thousand closures per minute have been conveniently accomplished. The fundamental reason for the success of the apparatus is that no moving parts, other that the rotating discriminator wheel, are required and the operation of the device is therefore extremely reliable.

Modifications of the invention will be readily apparent to those skilled in the art, and it is intended that the scope of the invention be determined by the appended claims.

We claim:

1. Apparatus for orienting cup shaped caps moving at high speed in side by side rolling relationship so that all caps have their recessed sides facing the same direction, each said cap having a disc-shaped panel portion and a peripheral wall defining a recess, comprising a first chute guiding the moving caps in non-oriented relationship, said first chute having a pair of spaced walls respectively guiding the panel portion and the peripheral wall of the inserted caps, a second and a third chute respectively connecting in a Y-shaped juncture with the end of said first chute, the outer wall of said second chute constituting a continuation of one wall of said first chute and the outer wall of the third chute constituting a continuation of the other wall of said first chute, the inner walls of said second and third chutes joining in a sharp vertex disposed in alignment with the lateral center of said first chute, the juncture area of said one wall having an elongated slot therein, a rotating discriminator wheel having a cylindrical rim portion entering said slot, said cylindrical rim portion having an elastomeric surface and being proportioned to impart a compressive force on each successive cap entering the chute juncture area from said first chute, the chute wall opposite said wheel periphery having an aperture therein to permit only a trailing segment of a cap rim to be depressed therein, said aperture being circular and having its axis passing through the axis of rotation of said discriminator wheel, and said vertex is spaced from said axis by the diameter of the caps whereby caps having their recessed sides facing toward the wheel are shifted toward the wheel axis, hence into said second chute, while caps having their recessed sides facing away from the wheel are moved by the wheel into said third chute.

2. Apparatus for orienting cup shaped caps moving at a high speed in side by side rolling relationship so that all caps have their sides facing the same direction, each said cap having a disc shaped panel portion and a peripheral wall defining a recess, comprising, in combination, a first chute guiding the moving caps in non-oriented relationship, said first chute having a pair of spaced walls respectively guiding the panel and the peripheral wall of the inserted caps, a discriminator wheel having a elastomeric cylindrical surface mounted for rotation about an axis aligned with, but laterally spaced from the end of said first chute, an arcuate second chute connected to said end of said first chute in generally tangential relationship to said discriminator wheel and extending around the wheel, the juncture area of the inner walls of said first and second chutes having a slot to receive the cylindrical periphery of said discriminator wheel, thereby permitting the elastomeric wheel surface to compressively engage the panel or the peripheral wall of the successive caps, and the outer wall of said first chute having a generally circular aperture opposite said wheel slot to permit only the trailing segment of each cap to enter said aperture, said aperture having a central axis which is positioned in a manner so as to lie in a vertical plane perpendicular to said outer wall and passing through the axis of rotation of said discriminator wheel, and said vertex is spaced from said axis by the diameter of the caps whereby caps having their recessed faces engaged by the elastomeric surface are pivoted by the elastomeric surface to swing the leading edge of each such cap to enter said second chute.

* * * * *